Patented Jan. 23, 1923.

1,443,328

UNITED STATES PATENT OFFICE.

EDMUND HERZ, OF VIENNA, AUSTRIA.

EXPLOSIVE AND PROCESS OF MAKING SAME.

No Drawing.   Application filed November 3, 1919.   Serial No. 335,553.

*To all whom it may concern:*

Be it known that I, EDMUND HERZ, of Vienna, Austria, an Austrian citizen, have invented certain new and useful Improvements in an Explosive and Process of Making Same (for which I have filed an application in Great Britain July 29, 1914, Patent No. 17,961; in Austria June 20, 1914, Patent No. 5,492), of which the following is a specification.

In general there has heretofore been in use for the filling of primers for the cartridges for small arms, guns and the like a substance known by the name of fulminate of mercury.

It has been proposed among other things to use as a substitute for this dangerous and dear substance the metal salts of picric acid. On account of the small sensitiveness and its inferiority with regard to the ability of igniting, these substitutes could not replace fulminating mercury and were therefore used only to a very limited extent in non-corroding primers in connection with fulminate of mercury. Nor could the salts of the trinitroderivates of multiple-valued phenols, for instance of resorcine, find their way into practice, since they possess essentially the same qualities as the picrates and are even inferior to these regarding their power of explosion.

I have found the surprising fact, that the normal lead salt of trinitro-resorcine behaves entirely differently and that it represents an extremely high-grade explosive, which is especially well suited for making a highly explosive primer. This normal lead salt, which is represented by the formula $C_6H(NO_2)_3O_2Pb$ has so far been unknown. In the literature there is only mentioned a basic salt having the formula

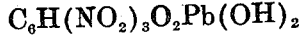

—see Beilstein Vol. II/1 page 926—a flaky product of light yellow color, which, however, could not come into question as an explosive on account of its poor explosiveness and its large volume.

From the process which is employed for making this normal lead salt it follows also, that this substance has been heretofore unknown. If any soluble lead salt, for instance acetate of lead is precipitated with trinitro-resorcine or the soluble salts of the same, there will always be obtained only a mixture of a basic salt and free trinitro-resorcine. If a surplus of trinitro-resorcine is employed, there will be formed immediately inconstant acidic salts. The normal salt is not accessible in this way. It was found, however, that the normal salt may be obtained in a quantitative way, if one precipitates a multiple of the equivalent weight of the lead salt of a strong inorganic acid, for instance nitrate of lead, in the presence of a weak organic acid, for instance acetic acid, in a very weak solution and in heated condition with the alkali-metal salts or alkaline earth salts of trinitro-resorcine.

As an example, the process may be carried out in the following manner: 245 g. of dry trinitro-resorcine are dissolved together with 290 g. crystalline carbonate of sodium in 12.8 liters of boiling water, and after the dissolution has taken place, 77 ccm. of acetic acid of one hundred per cent is added. The boiling solution is mixed with a likewise boiling soltution of 650 g. nitrate of lead in 1.4 liters of water under lively motion, and thereupon the mixture is brought to the boiling point for about two minutes and quickly cooled off while constantly stirring the same. The precipitated crystals are filtered out and washed several times in cold water and dried. The normal trinitro-resorcinate of lead in contradistinction to the known basic salt consists of a powder of granular crystalline structure of dark orange color and of a density D of 19 degrees=3.09. It is extremely difficult to dissolve the same in water, even in heated condition. The explosive qualities, however are extremely surprising in comparison with those of the picrates and the other salts of trinitro-resorcine. It explodes, when ignited, even in very small quantities with enormous vehemence. For instance, a quantity of 2 g. loosely heaped up, will produce upon a lead plate of a thickness of 2 mm. a perforation of 4 to 5 $cm^2$. Equal quantities of picrate of potassium, picrate of lead and trinitro-resorcinate of potassium will explode under the same condition without detonation and without any demonstrable effect.

The similarity of the effects of the picrates and the heretofore known salts of the trinitro-resorcine, as well as the extraordinary qualities of the normal trinitro-resorcinate of lead can best be seen from the following:

I. Extension resulting from explosion in a small lead-block, bore 6.5 mm., weight of the substance 1 g., pressed into cartridge shell No. 8 with interior cap:

With picrate of potassium: only partial explosion, no measurable extension,

With picrate of lead: only partial explosion, no measurable extension,

With trinitro-resorcinate of potassium: only partial explosion, no measurable extension, With normal trinitro-resorcinate of lead: detonation; extension of 9.69 ccm.

II. Tests for finding the sensitiveness of explosion made with a falling weight of 750 g.; substance in air-dry condition.

Picrate of potassium: will detonate at an altitude of fall of 125 cm.

Trinitro-resorcinate of potassium: will detonate at an altitude of fall of 119 cm.

Picrate of lead: will detonate at an altitude of fall of 97 cm.

Normal trinitro-resorcinate of lead: will detonate at an altitude of fall of 1.3 cm.

On account of this high power of explosion and sensitiveness the normal trinitro-resorcinate of lead is especially well suited for making primers for cartridges or the like. For this purpose this substance may be used alone or still better in conjunction with carriers of oxygen, chlorates, perchlorates, nitrates, peroxides, permanganates, chromates, etc., and the usual constituents for primers such as trisulfide of antimony, glass-powder etc.

Primers made according to this are far cheaper in price than those made with fulminating mercury and in addition to this have the advange of producing a more uniform and more powerful effect, which results in an increase of the initial velocity and of the penetrating force of the projectile.

Moreover the primers which are made without the use of chlorate of potassium are positively non-corroding and absolutely moisture-proof.

In addition to this, the normal trinitro-resorcinate of lead may be employed with especial advantage for cartridges for Flobert rifles or for similar cartridges of small size, where the highly explosive substance serves simultaneously as driving agent. By reason of the far greater power and the far greater volume of the gases of explosion the force of penetration will be essentially increased as compared with an equal quantity of fulminate of mercury. Since the charge may be increased by reason of the somewhat smaller rate of detonation, without, however, causing the gas pressure to assume an impermissibly high value and risking a destruction of the cartridge, it will be easily possible to raise the penetrating force of the projectile to a value which is from two to three times greater than normal.

The substance of my present invention is further well suited for making intitial primers or fuses which operate in conjunction with fulminate of mercury. If, for instance 1 g. trinitro-toluol is provided with a coating of 0.2 g. trinitro-resorcinate of lead and upon the latter with a coating of 0.15 g. fulminate of mercury and inserted in a detonating cap shell No. 8, with a considerable saving the same effect will be obtained as when employing 1 g. trinitro-toluol having the usual coating of 0.55 g. of fulminate of mercury. At the same time these combined shells are far more insensitive against moisture than detonating caps having only a coating of fulminate of mercury.

In the same manner the effect will be far better than with pure fulminate of mercury, when employing mixtures, for instance of 40 per cent fulminate of mercury and 60 per cent normal trinitro-resorcinate of lead, or 30 per cent fulminate of mercury, 50 per cent trinitro-resorcinate of lead and 20 per cent chlorate of potassium.

Having thus described my invention, I claim as new and desire to secure by Letters Patent:

1. As an article of manufacture, the new explosive which is represented by the chemical formula $C_6H(NO_2)_3O_2Pb$.

2. Primer of cartridges containing a new substance represented by the chemical formula: $C_6H(NO_2)_3O_2Pb$.

3. Primer of cartridges containing a mixture of new substance represented by the chemical formula: $C_6H(NO_2)_3O_2Pb$ with carriers of oxygen, trisulfide of antimony and powdered glass.

4. Primer for detonating caps containing a new substance represented by the chemical formula: $C_6H(NO_2)_3O_2Pb$ in combination with fulminate of mercury.

In witness whereof I have hereunto set my signature.

EDMUND HERZ.